(12) United States Patent
Bhattacharya

(10) Patent No.: US 12,675,317 B2
(45) Date of Patent: Jul. 7, 2026

(54) SYSTEM AND METHOD FOR PREDICTION OF JOB TIMES WITHIN AN ANALYTICS ENVIRONMENT

(71) Applicant: Oracle International Corporation, Redwood Shores, CA (US)

(72) Inventor: Tarun Bhattacharya, Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 762 days.

(21) Appl. No.: 17/680,077

(22) Filed: Feb. 24, 2022

(65) Prior Publication Data

US 2023/0266998 A1 Aug. 24, 2023

(51) Int. Cl.
| | |
|---|---|
| *G06F 9/48* | (2006.01) |
| *G06F 9/30* | (2018.01) |
| *G06F 9/54* | (2006.01) |
| *G06F 18/214* | (2023.01) |
| *G06N 20/00* | (2019.01) |

(52) U.S. Cl.
CPC .......... *G06F 9/4881* (2013.01); *G06F 9/3017* (2013.01); *G06F 9/542* (2013.01); *G06F 18/214* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,372,858 | B2 | 6/2022 | Ignatyev | |
| 2014/0089727 | A1* | 3/2014 | Cherkasova | ........ G06F 11/0715 |
| | | | | 714/6.13 |
| 2018/0018610 | A1* | 1/2018 | Del Balso | ................ G06N 3/09 |
| 2018/0336247 | A1 | 11/2018 | Ignatyev | |
| 2020/0125568 | A1* | 4/2020 | Idicula | ................... G06N 20/20 |

OTHER PUBLICATIONS

Oracle, "Oracle CX Sales and B2B Service Creating and Administering Analytics" 21C Part No. F42755-02, Copyright © 2011, 2021 , 190 pages.

* cited by examiner

*Primary Examiner* — Eric C Wai
(74) *Attorney, Agent, or Firm* — TUCKER ELLIS LLP

(57) ABSTRACT

Described herein are systems and methods for prediction of job times within an analytics environment. As jobs are executed, for example, within an application analytics environment, and the complexity of the jobs grow, it is becoming increasingly important to provide an accurate estimation of job completion time. Artificial intelligence and/or machine learning can be utilized, together with one or more of a pre-trained model and a transferred-learning model, to develop a job prediction time model that can be utilized to provide an estimation for a job runtime prediction. In addition, an alert can be provided in the event that a job runs longer than predicted.

20 Claims, 10 Drawing Sheets

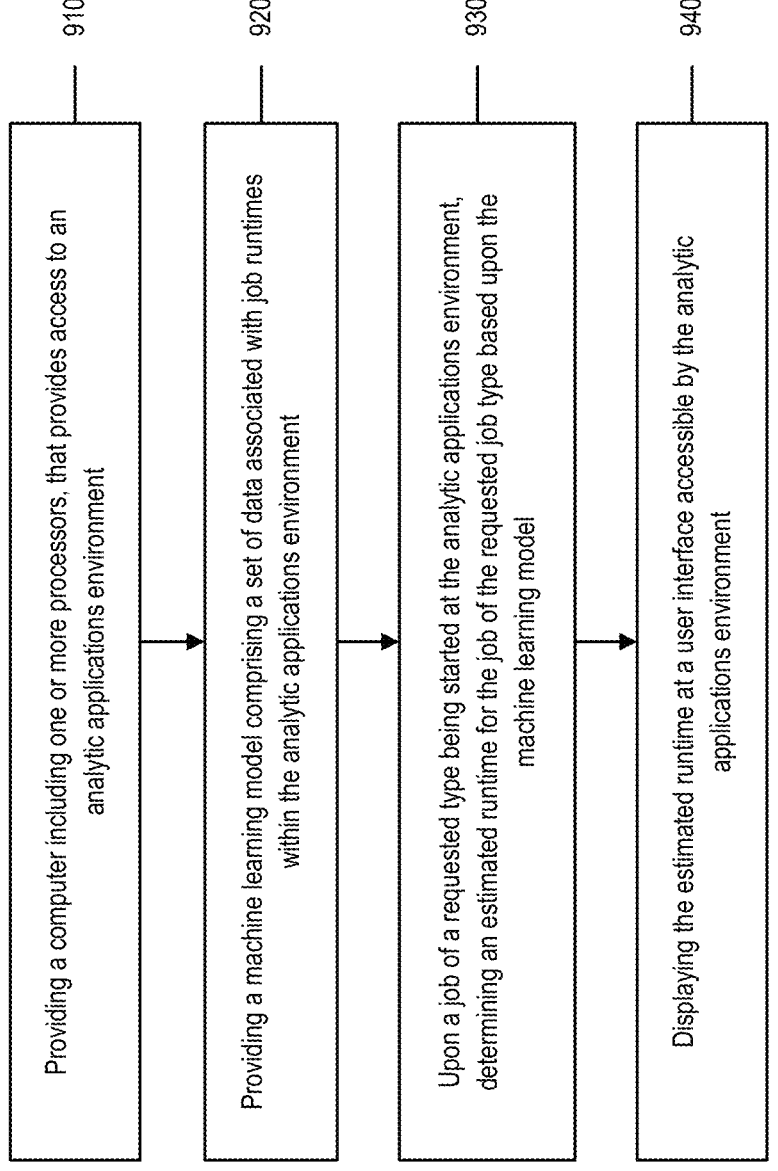

Providing a computer including one or more processors, that provides access to an analytic applications environment

910

Providing a machine learning model comprising a set of data associated with job runtimes within the analytic applications environment

920

Upon a job of a requested type being started at the analytic applications environment, determining an estimated runtime for the job of the requested job type based upon the machine learning model

930

Displaying the estimated runtime at a user interface accessible by the analytic applications environment

SYSTEM AND METHOD FOR PREDICTION OF JOB TIMES WITHIN AN ANALYTICS ENVIRONMENT

COPYRIGHT NOTICE

TECHNICAL FIELD

Embodiments described herein are generally related to computer data analytics, computer-based methods of providing business intelligence data, and systems and methods, for use with an analytic applications environment, for predicting of job runtimes within an analytics environment.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

During the loading of data, from one or more data sources, to a data warehouse or other database, there may be a need to prepare the data in some manner; for example by extracting the data from a highly-normalized transactional system data source, and transforming the data into one or more data warehouse or database schemas that support analytic querying and business intelligence processes.

For example, an Extract, Transform, and Load (ETL) process can be used to extract data from a source database, pass the data through a middle-tier transformation server, and then transform the data into a schema suitable for use in a data warehouse. During such process, data that may need to be looked-up from the target database can be cached on a local server. Once the data is transformed locally, it can be loaded into the target database.

A data warehouse can store large amounts of enterprise-critical data, such as, for example, data related to procurement prices, employee salaries, or expense reports; and as such is rich in valuable business intelligence information. However, conventionally the data stored by an organization in a data warehouse is generally not shared with other organizations; and instead each organization has generally been limited to only that information that could be extracted from their own data warehouse.

SUMMARY

In accordance with an embodiment, described herein are systems and methods for prediction of job times within an analytics environment. As jobs are executed, for example, within an application analytics environment, and the complexity of the jobs grow, it is becoming increasingly important to provide an accurate estimation of job completion time. Artificial intelligence and/or machine learning can be utilized, together with one or more of a pre-trained model and a transferred-learning model, to develop a job prediction time model that can be utilized to provide an estimation for a job runtime prediction. In addition, an alert can be provided in the event that a job runs longer than predicted.

BRIEF DESCRIPTION OF THE DRAWINGS

FIG. 10 is a flowchart of a method for prediction of job times within an analytics environment, in accordance with an embodiment.

DETAILED DESCRIPTION

Figure 1:
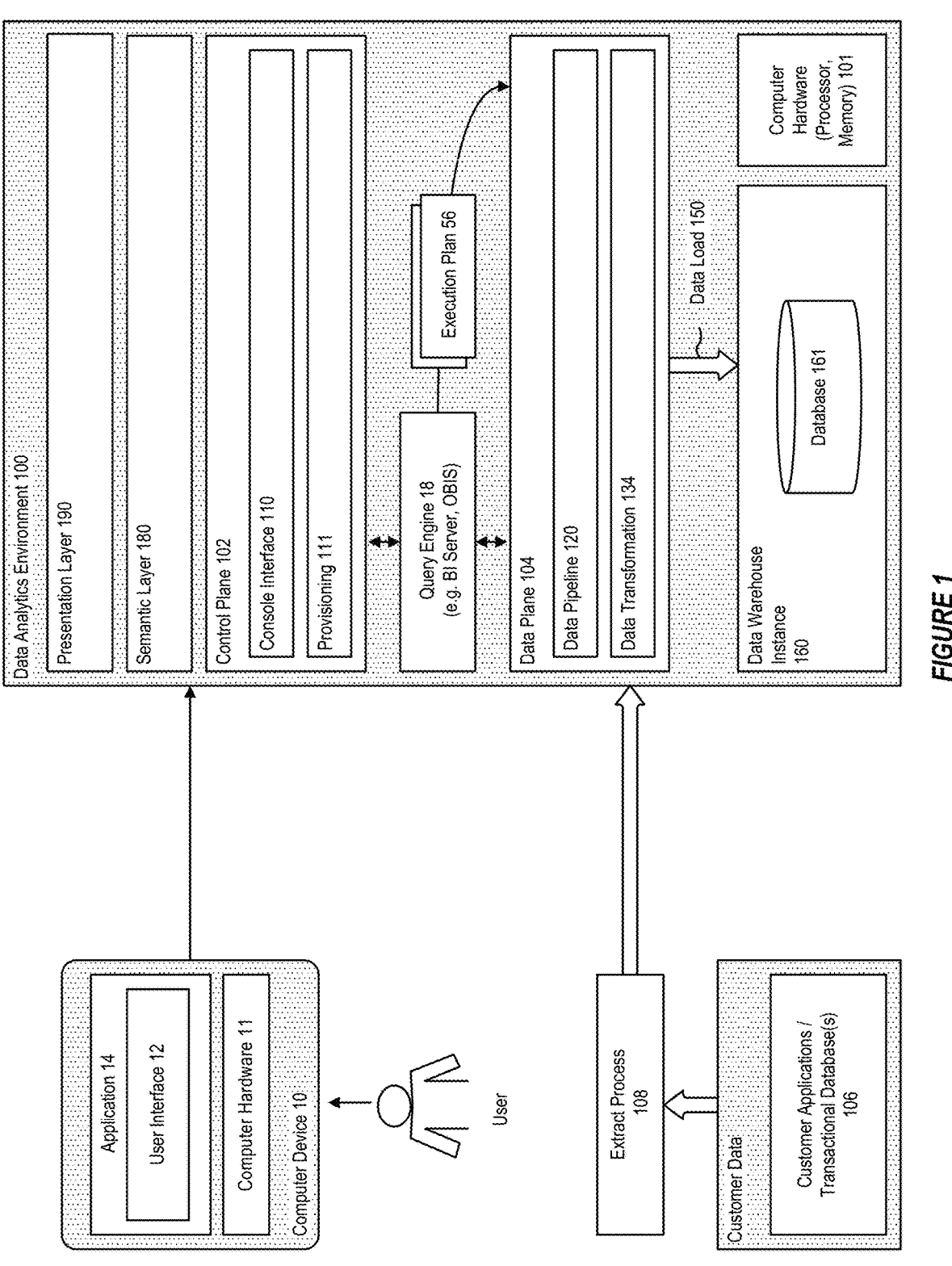
FIG. 1 illustrates an example data analytics environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

Data Analytics Environments

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAVV), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
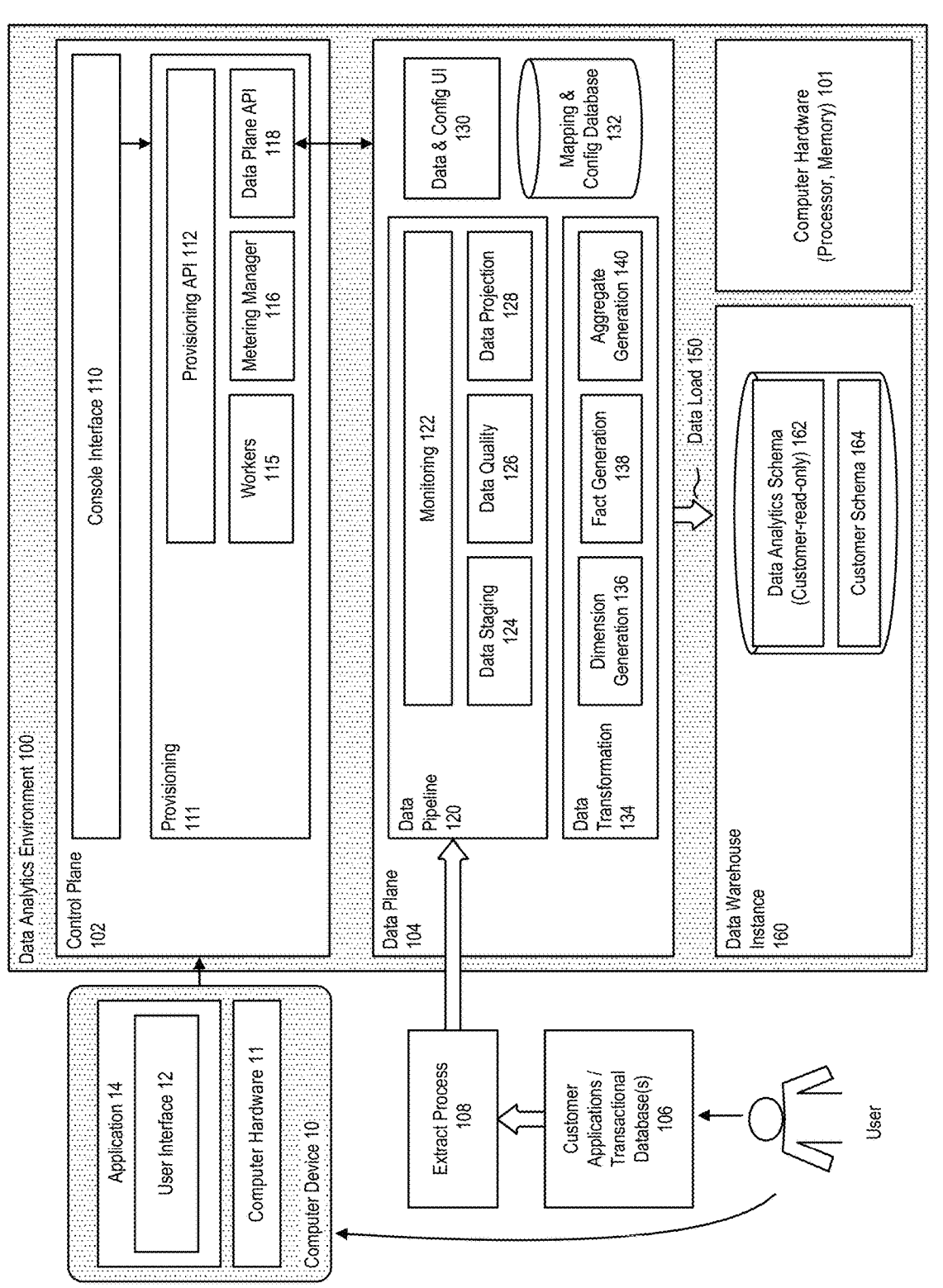
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
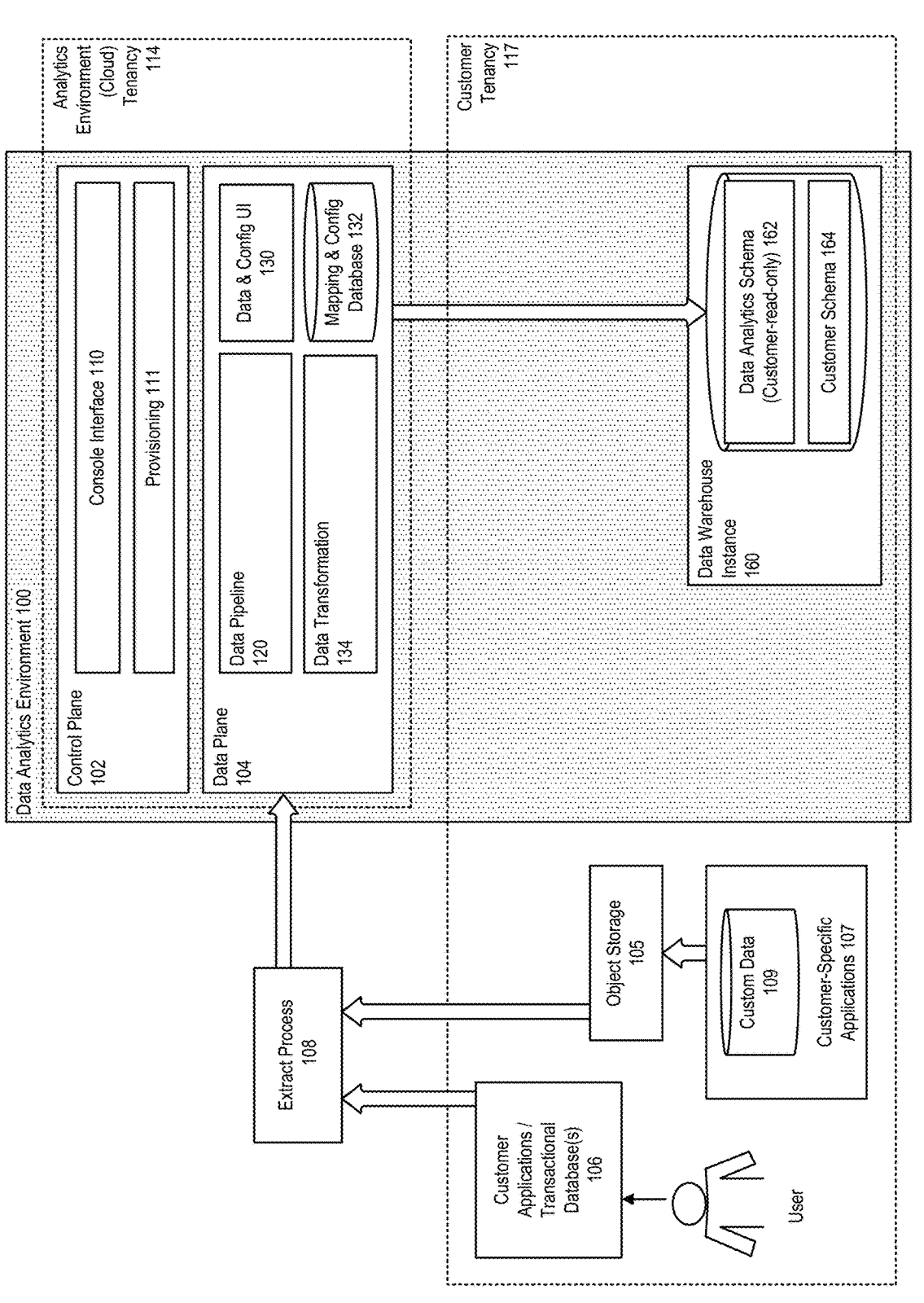
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a data set that uses tables from different connections and schemas. The system uses the relationships defined between these tables to create relationships or joins in the data set.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADVV) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
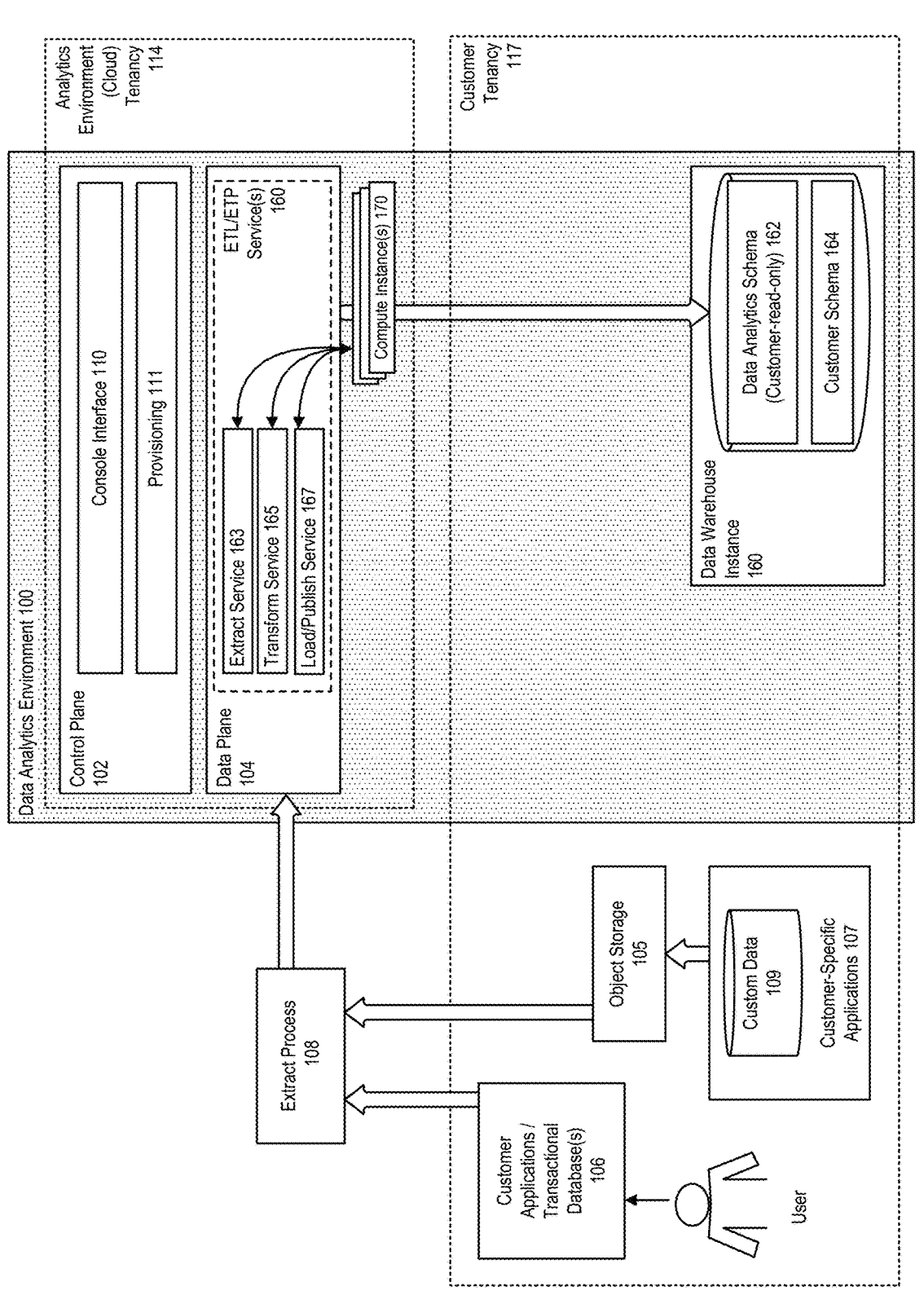
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a ReST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
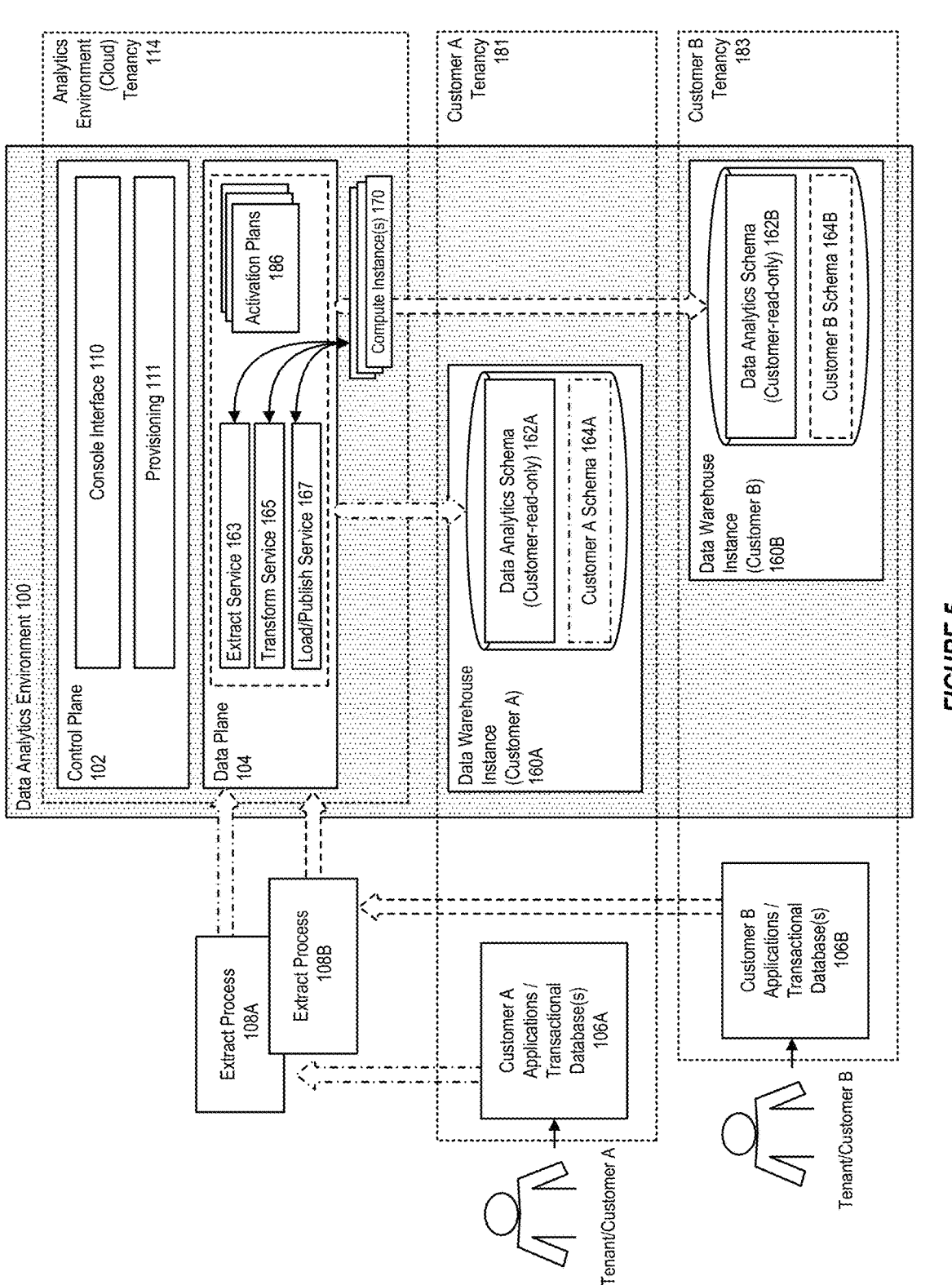
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Enterprise Scheduler Server

Figure 6:
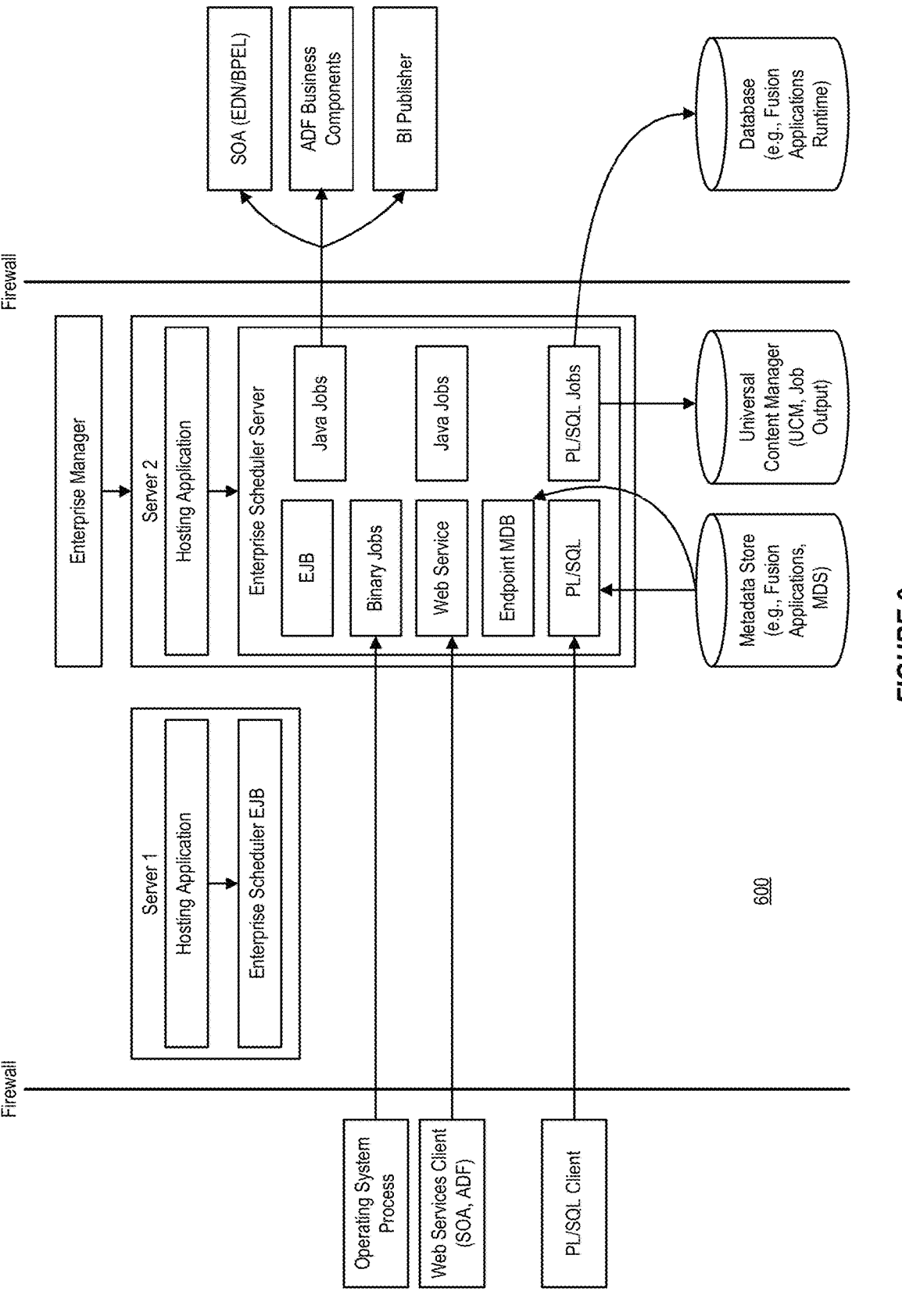
FIG. 6 illustrates an example enterprise scheduler server environment, in accordance with an embodiment.

FIG. 6 illustrates an example enterprise scheduler server environment, in accordance with an embodiment.

The example illustrated in FIG. 6 is provided for purposes of illustrating a non-limiting example embodiment of an enterprise scheduler server/service (ESS) environment, for example an Oracle Enterprise Scheduler Server instance, which can be installed to a server that includes Oracle Java Required Files (JRF) and can be secured by a service, for example Oracle Web Services Manager.

In accordance with an embodiment, an enterprise scheduler can manage scheduled job submissions and job definitions. Examples of client applications that can request the execution of a scheduled job can include, for example, Oracle Fusion applications, Web service clients such as SOA or Oracle Application Development Framework (ADF) components, and PL/SQL applications.

In accordance with an embodiment, a controller, for example Oracle Fusion Middleware Control, can enable clients to manage enterprise scheduler clusters, services, and jobs. The enterprise scheduler can access metadata using, for example, Oracle Metadata Services (MDS). Scheduled job output can be saved to a database, for example Oracle WebCenter Content. The enterprise scheduler can include interfaces (APIs) that enable interaction with applications and with external components. For example, a PL/SQL client can utilize an enterprise scheduler PL/SQL API to request a scheduled job.

In accordance with an embodiment, an enterprise scheduler can access components such as, for example, Java jobs that access SOA components, ADF Business Components services, or Oracle Business Intelligence Publisher components. Client applications accessing EJBs can connect to the enterprise scheduler using, for example, remote method invocation (RMI), while client applications using web services can use, for example, HTTP.

Prediction of Job Times

In accordance with an embodiment, the systems and methods disclosed herein provides predictions of job runtimes within an analytics environment.

In accordance with an embodiment, currently, users of an analytics environment are not able to determine or estimate a job completion time for tasks, such as enterprise scheduler server/service (ESS) jobs.

In accordance with an embodiment, once transactions are created in an analytics environment, such as Oracle Fusion Applications, customers rely heavily on the ESS jobs which processes the transactions and provide the required/desired output. Customers can rely upon the outputs from various ESS jobs to plan for and execute further actions. Thus, having an accurate prediction of job runtime/execution time is desirable.

In accordance with an embodiment, here are some examples of actions that are based upon ESS jobs. In accordance with an embodiment, after completion of "Auto Invoice Import ESS Job", Sales Orders are created, and the goods can be shipped. Alternatively, after completion of "Import Calc ESS Job", sales reps are paid their respective incentive compensation (e.g., a commission). After completion of "Period Inventory Valuation ESS Job", the value of inventory items is received. Finally, after completion of "Period End ESS Jobs", general ledger books can be closed, and the trial balance and the balance sheets can be prepared.

In accordance with an embodiment, the disclosed systems and methods can provide an estimated time for completion, or an estimated duration of ESS jobs running within an analytics environment. In addition, such estimated completion time or estimated duration can be displayed, e.g., via a user interface, such as via a progress bar or other similar display.

In accordance with an embodiment, the systems and methods can build and maintain a model based on previous executions and multiple other parameters which has a dependency of an ESS job and then provide an estimated time when the current running job (e.g., ESS job) should end/complete. If it goes beyond the estimated time, an alert can be signaled and provided to a user via, e.g., a user interface or via another alert mechanism, such as a notification via an application in communication with the analytics environment (e.g., a mobile app), or via email or SMS notification.

In accordance with an embodiment, the model that is built and maintained can be a generic model and not specific to any given user/client of the analytics environment or to any specific ESS job. Rather, the model can be based upon, for example, a computational neural network and/or a deep learning architecture, which can take into account a number of features/factors, such as:

Number of rows the job is processing

Server

Load at the time of execution

Number of users logged into the system when the jobs are running

Number of database tables getting impacted with the current job run

Complexity of job

In accordance with an embodiment, a pre-trained model can be supplied initially. This model can then be built on and maintained by the provided systems and methods.

In accordance with an embodiment, the systems and methods described herein can provide a user a predicted time by when the a job, such as an ESS job, will complete. If a job runs beyond the predicted time, the systems and methods can automatically provide an alert, e.g., to provide notification about the delay. A generic model can be provided that can fit any given analytics environment program or product. This generic model can then be further trained based on new data.

Figure 7:
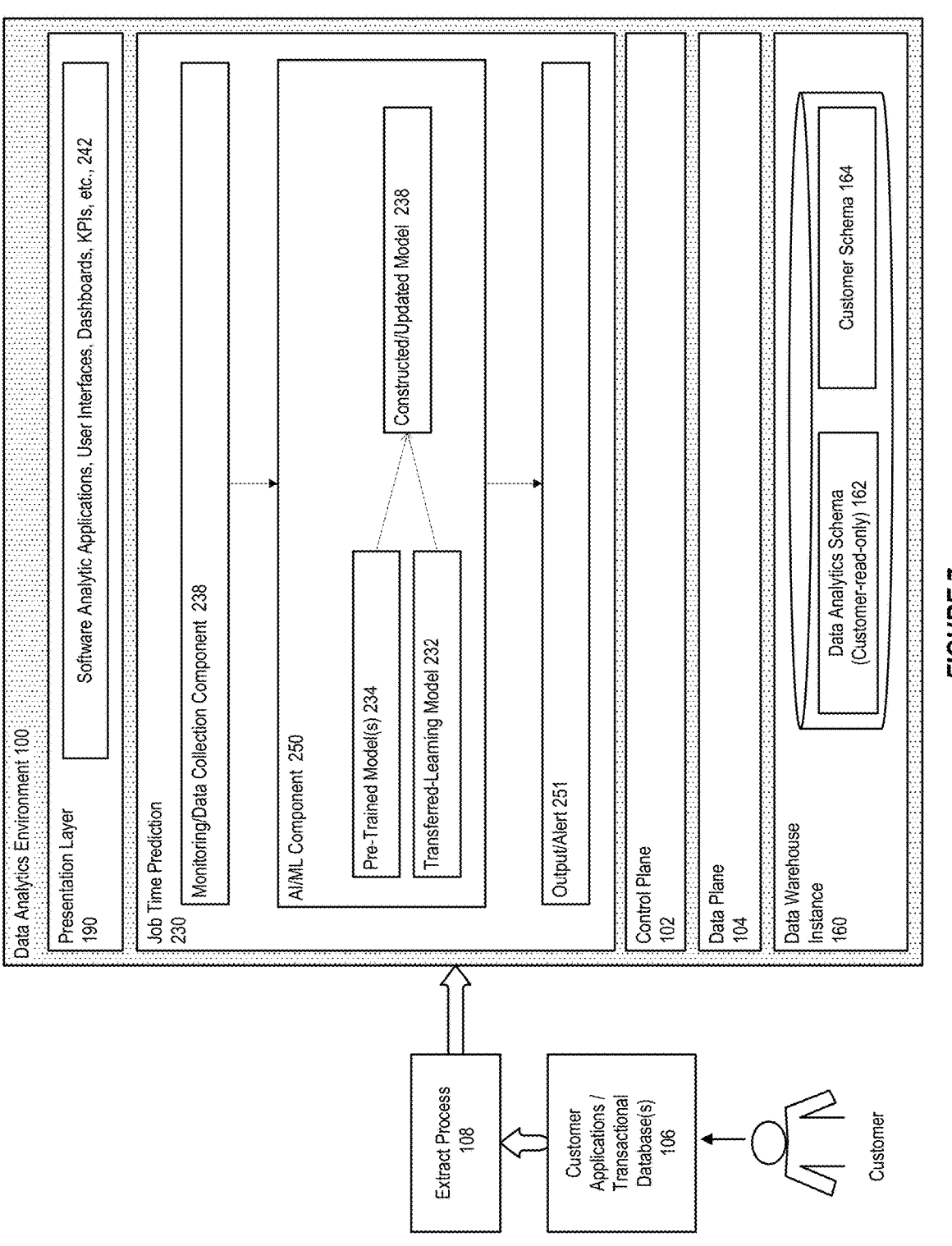
FIG. 7 shows an exemplary architecture for prediction of job times within an analytics environment.

FIG. 7 shows an exemplary architecture for prediction of job times within an analytics environment.

In accordance with an embodiment, the system can include a job time prediction component 230, which provides one or more mechanisms of predicting job runtime within, e.g., a data analytics environment 100.

For example, as illustrated in FIG. 7, in accordance with an embodiment, the system can comprise one or more a job time prediction component 230. The component 230 can comprise a monitoring and data collection component 238 that can monitor and track metrics associated with jobs running within the system. An artificial intelligence/machine learning component 250 can be associated with one or more pre-trained models 234, as well as one or more transferred-learning models 232.

In accordance with an embodiment, a constructed or updated job prediction model 238 can be a result of the AI/ML component 250 utilizing one or more of the pre-trained model and the transferred-learning model along with data and metric supplied by the monitoring component 238.

Figure 8:
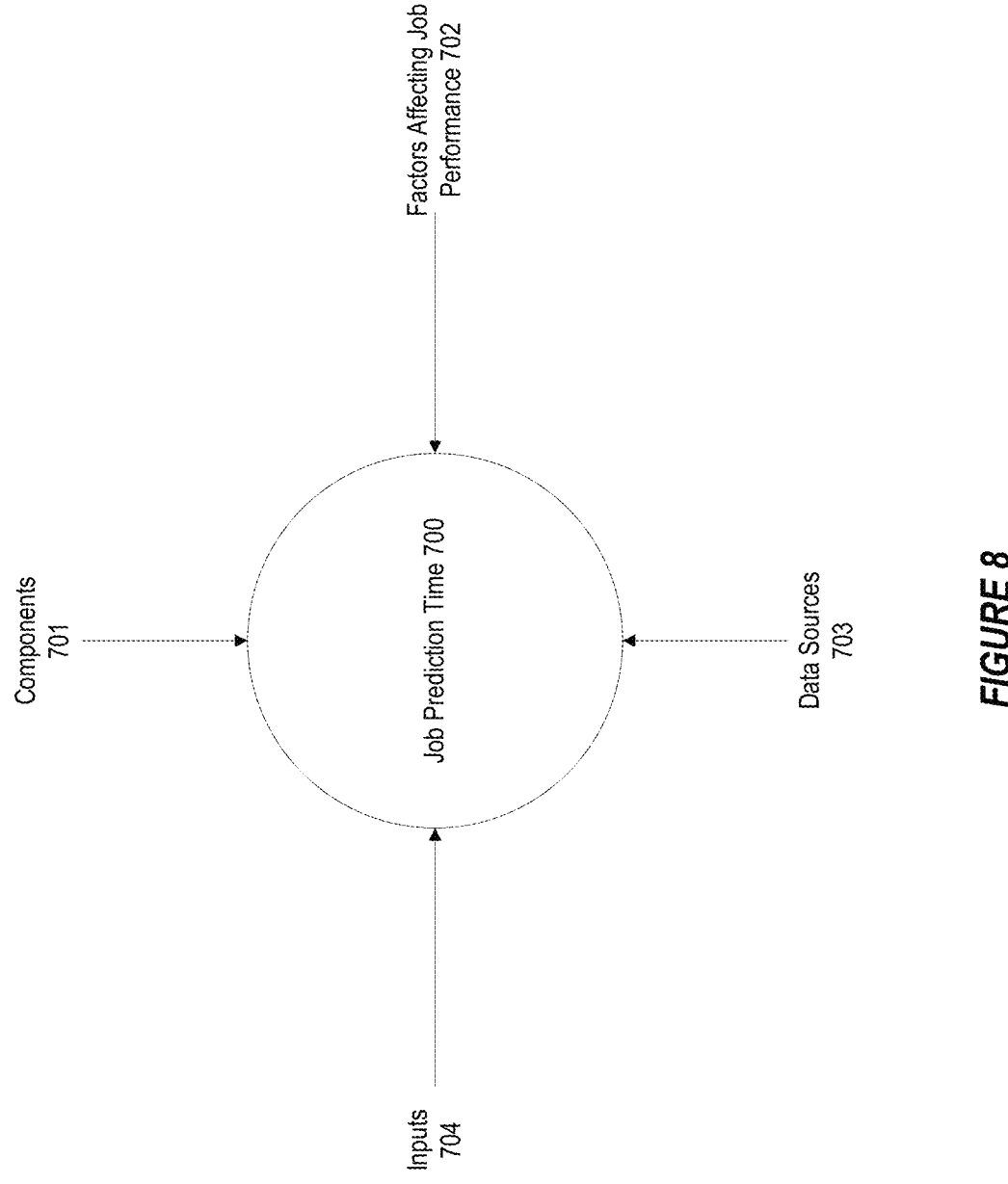
FIG. 8 shows an exemplary chart of components used for ESS job time prediction, in accordance with an embodiment.

In accordance with an embodiment, upon a new job being started, such as an ESS job, the AI/ML component can provide an output 251, where the output comprises, for example, a prediction of a time for job completion, or an alert signaling that a running job is taking longer than originally predicted by the AI/ML component. Such output or alerts can be provided via, e.g., a user interface, a message (e.g., email), a text message, or the like FIG. 8 shows an exemplary chart of components used for ESS job time prediction, in accordance with an embodiment.

In accordance with an embodiment, all or some of several factors can be considered when predicting a job completion 700 time for a job, such as an ESS job. These include components 701, factors affecting job performance 702, the data sources 703, and inputs 704. Each of these components can be taken into consideration when making a prediction of a job runtime.

In accordance with an embodiment, an input layer can be used as an input that can be passed to the model. For each input 704, such as jobs including, but not limited to, ESS jobs, EJB jobs, Java jobs, PL/SQL jobs, Binary jobs, web service jobs, features can be extracted as input to further train a job time prediction model. These features/factors can be associated with components 701, data sources 703, and other factors affecting job performance, 702.

In accordance with an embodiment, features/factors that can be derived from components 701 can comprise, for example, factors associated with a server or servers, such as an application development framework (ADF) server. Such factors can include, for example, a number of libraries that are used for any given job, such as a RuntimeServiceEJB library, and a MetadataServiceEJB library.

In accordance with an embodiment, further features/factors that can be derived from components 701 can comprise, for example, factors associated with a scheduler service, such as a number and type of jobs that are running in parallel with the job that has the completion time be predicted for. Component factors/features can further associated with a core runtime, such as an enterprise scheduler application. Such factors can include how many JCA Resource adapters or multiple EJB components, as well as a number of JRF web service modules involved in the job.

In accordance with an embodiment, features/factors that can be derived from components 701 can comprise, for example, factors associated with hosting applications, such as a number of libraries are that imported and shared (e.g., ESSEndpointMDB, RuntimeServiceEJB, MetadataService-EJB). Such features/factors can also be associated with a database scheduler service, which can be associated with PL/SQL jobs. Factors/features associated with the database scheduled can take into account, for example, a number of tables and a count of rows are involved for this job, as well as a number of complex Cartesian joins that are used. The database schedule service features/factors can also be impacted by Java Process APIs, for example, a number of native binary jobs that are running simultaneously.

In accordance with an embodiment, features/factors that can be derived from data sources 703 can be associated with an identity and type of job. For example, XA emulation jobs are global transactions and are dependent on how many multiple resources are spanned. Non-XA emulation jobs are a single resource job, and are not a global transaction. Jobs that have external dependency can be identified and associated with a number of components involved with the job. Other types of data sources that can have features/factors derived therefrom include, but are not limited to: MDS repository, SOA suite, ADF Business Components, BI Presentation Services, WebCenter Content.

In accordance with an embodiment, features/factors can also be derived from other factors affecting job performance 702. These can include, for example, database size and available space, database server health, middleware server health, network bandwidth, SOA server queue/threads, a number of parallel jobs running concurrently. In addition, the scheduling of the job can also have an impact on the job prediction time, such as what time of day the job is run, what time of week/month/year. A number of users logged in during the initiation of the job can also impact the job prediction time. Additionally, a category of job can also be imposed to add to the job prediction, such as long-running jobs (e.g., >12 hrs), medium run jobs (e.g., >6 hours, <12 hours), and short run jobs (e.g., <6 hours). Additionally, the systems and methods can utilize recorded prior data to aid in the prediction of current job time. This can come from recorded and stored runs of the same or similar jobs.

In accordance with an embodiment, the constructed model can be built using one or several different techniques. A first technique that can be used to build the constructed model is to utilize a pre-trained mode. A pre-trained model can utilize deep neural architecture using existing data, such as prior ESS job data. Such existing job data can be used to train and test the pre-trained model. The pre-trained model can have the model tested and verified by comparing the predicted output vs actual outputs in real time. The pre-trailed model can be an iterative process, changing a hidden layer architecture until the model get a close to actual ETA results. Once the pre-trained model has been verified, the pre-trained model can be passed to the AI/ML component as out-of-box in cloud applications, for individual product teams to incorporate and use it as transferred learning for each specific ESS job.

In accordance with an embodiment, pre-training in artificial intelligence refers to training a model with one task to help it form parameters that can be used in other tasks. In AI, pre-training imitates the way human beings process new knowledge. That is: using model parameters of tasks that have been learned before to initialize the model parameters of new tasks There are several substantial benefits to leveraging pre-trained models:

Simple to incorporate.

Achieve solid (same or even better) model performance quickly.

Cuts down on labelled data required

Versatile uses cases from transfer learning, prediction, and feature extraction.

In accordance with an embodiment, the model utilized by the AI/ML component can also/additionally be built based on, for example, a Deep Neural Architecture. The model can start with a simpler Model and then go deeper as the systems and methods proceed. The model can be built and refined using pre-existing database of data on jobs, such as ESS job times. Such data can be used to train and test the model, as well as verifying the predicted output vs actual outputs in real-time. This process can be re-iterated, keep changing the hidden layer architecture, until the model predicts a decent predicted ETA results.

In accordance with an embodiment, the model utilized by the AI/ML component can also/additionally be built upon a transferred learning model. Once a pre-trained model has been built, transferred learning can be utilized. Transferred learning is a machine learning technique where a model trained on one task is re-purposed on a second related task based on some factors.

Figure 9:
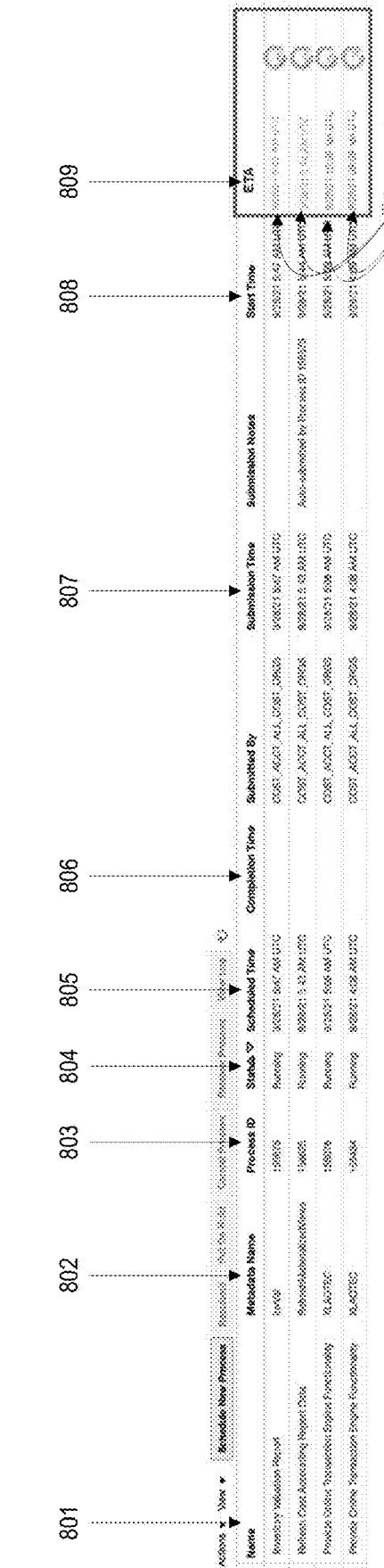
FIG. 9 shows an exemplary screenshot showing predictions of job times, in accordance with an embodiment.

FIG. 9 shows an exemplary screenshot showing predictions of job times, in accordance with an embodiment.

In accordance with an embodiment, FIG. 9 shows a screenshot 800 of a job status and job prediction window. More specifically, the screenshot 800 shows four jobs currently running within a system, each of which is shown with a prediction of job runtime.

In accordance with an embodiment, displayed within screenshot 800 are several running jobs, each having a name 801, a metadata name 802, a process identification 803, a status 804, a scheduled time 805 (e.g., scheduled time for the job to start), a completion time 806, a submission time 807, an actual start time 808, and estimated time of completion, ETA 809.

In accordance with an embodiment, the ETA 809 can result from the above described systems and methods, utilizing artificial intelligence and machine learning, along with monitored data and one or more existing models (e.g., pre-trained model and/or transferred learning model), and can be based upon a resultant constructed model 238 to output the predicted ETA 809 for the given job.

In accordance with an embodiment, as shown, the ETA field 809 can be updated, for example, once a job has run longer than predicted. Here, the top two jobs are shown as being within the parameters of the job run prediction time, while the bottom two jobs are shown as running longer than predicted by the systems and methods described herein.

In accordance with an embodiment, the ETA field 809 can be updated automatically, for example, once a job is running longer than predicted. As well as updating the field in the screenshot of 800, an alert can be triggered to notify a user that a job is running longer than predicted. Such an alert can take the form of an email, a pop up, an text message, or any similar mechanism.

In accordance with an embodiment, once the monitoring component 238 detects that a job has completed, data and metrics related to the job completion time, as well as the other factors of the job, can be recorded and utilized in constructing an updated/constructed model.

FIG. 10 is a flowchart of a method for prediction of job times within an analytics environment, in accordance with an embodiment.

In accordance with an embodiment, at step 910, the method can provide a computer including one or more processors, that provides access to an analytic applications environment.

In accordance with an embodiment, at step 920, the method can provide a machine learning model comprising a set of data associated with job runtimes within the analytic applications environment.

In accordance with an embodiment, at step 930, the method can, upon a job of a requested type being started at the analytic applications environment, determine an estimated runtime for the job of the requested job type based upon the machine learning model.

In accordance with an embodiment, at step 940, the method can display the estimated runtime at a user interface accessible by the analytic applications environment.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for prediction of job times within an analytics environment, comprising:

a computer including one or more processors, that provides access to an analytic applications environment;

a machine learning model provided at the analytics applications environment, the machine learning model comprising a set of data associated with job runtimes within the analytic applications environment;

wherein a request for a transaction is received at the analytic applications environment, the requested transaction comprising a plurality of jobs, each of the plurality of jobs comprising a job type;

wherein upon a job of the plurality of jobs being started at the analytic applications environment, an estimated runtime for the job, the job comprising a job type, is determined based upon the machine learning model;

wherein the determination of the estimated runtime for the job of the plurality of jobs is based at least upon a plurality of factors, the plurality of factors comprising components associated with the job of the request; factors affecting performance of the job of the request, data sources associated with the job of the request, a schedule of the job, and inputs associated with the job of the request;

wherein the determination of the estimated runtime for the job of the plurality of jobs is further based at least upon dependencies of the job of the plurality of jobs external to the analytic applications environment;

wherein the estimated runtime is displayed at a user interface accessible by the analytic applications environment; and wherein, upon the estimated runtime being determined, the machine learning model is updated based at least upon the plurality of factors utilized in determining the estimated runtime for the job and the dependencies of the job of the plurality of jobs external to the analytics application environment.

2. The system of claim 1, wherein the machine learning model is at least based on a pre-trained model.

3. The system of claim 2, wherein the pre-trained model comprises training data associated with operations other than the requested job type.

4. The system of claim 1, wherein the machine learning model is at least based upon a transferred learning model.

5. The system of claim 1, wherein the analytics learning environment further comprises a monitoring component, the monitoring component monitoring data and metrics associated with the job of the requested job type.

6. The system of claim 5, wherein upon completion of the job of the requested job type, the machine learning model is updated based upon the monitored data and metrics associated with the job of the requested type.

7. The system of claim 5, wherein upon the job of the requested job type running longer that the estimated runtime, an alert is published by the applications analytics environment.

8. A method for prediction of job times within an analytics environment, comprising:

providing a computer including one or more processors, that provides access to an analytic applications environment;

providing a machine learning model at the analytics applications environment, the machine learning model comprising a set of data associated with job runtimes within the analytic applications environment;

receiving a request for a transaction at the analytic applications environment, the requested transaction comprising a plurality of jobs, each of the plurality of jobs comprising a job type;

upon a job of the plurality of jobs being started at the analytic applications environment, the job comprising a job type, determining an estimated runtime for the job of the requested job type based upon the machine learning model, wherein the determination of the estimated runtime for the job is based at least upon a plurality of factors, the plurality of factors comprising components associated with the job of the request; factors affecting performance of the job of the request, data sources associated with the job of the request, a schedule of the job, and inputs associated with the job of the request, wherein the determination of the estimated runtime for the job of the plurality of jobs is further based at least upon dependencies of the job of the plurality of jobs external to the analytic applications environment;

displaying the estimated runtime at a user interface accessible by the analytic applications environment; and upon the estimated runtime being determined, updating the machine learning model based at least upon the plurality of factors utilized in determining the estimated runtime for the job and the dependencies of the job of the plurality of jobs external to the analytics application environment.

9. The method of claim 8, wherein the machine learning model is at least based on a pre-trained model.

10. The method of claim 9, wherein the pre-trained model comprises training data associated with operations other than the requested job type.

11. The method of claim 8, wherein the machine learning model is at least based upon a transferred learning model.

12. The method of claim 8, wherein the analytics learning environment further comprises a monitoring component, the monitoring component monitoring data and metrics associated with the job of the requested job type.

13. The method of claim 12, wherein upon completion of the job of the requested job type, the machine learning model is updated based upon the monitored data and metrics associated with the job of the requested type.

14. The method of claim 12, wherein upon the job of the requested job type running longer that the estimated runtime, an alert is published by the applications analytics environment.

15. A non-transitory computer readable storage medium having instructions thereon for prediction of job times within an analytics environment, which when read and executed by a computer including one or more processors cause the computer to perform steps comprising:

providing a computer including one or more processors, that provides access to an analytic applications environment;

providing a machine learning model at the analytics applications environment, the machine learning model comprising a set of data associated with job runtimes within the analytic applications environment;

receiving a request for a transaction at the analytic applications environment, the requested transaction comprising a plurality of jobs, each of the plurality of jobs comprising a job type;

upon a job of the plurality of jobs being started at the analytic applications environment, the job comprising a job type, determining an estimated runtime for the job of the requested job type based upon the machine learning model, wherein the determination of the estimated runtime for the job is based at least upon a plurality of factors, the plurality of factors comprising components associated with the job of the request; factors affecting performance of the job of the request, data sources associated with the job of the request, a schedule of the job, and inputs associated with the job of the request, wherein the determination of the estimated runtime for the job of the plurality of jobs is further based at least upon dependencies of the job of the plurality of jobs external to the analytic applications environment;

displaying the estimated runtime at a user interface accessible by the analytic applications environment; and upon the estimated runtime being determined, updating the machine learning model based at least upon the plurality of factors utilized in determining the estimated runtime for the job and the dependencies of the job of the plurality of jobs external to the analytics application environment.

16. The non-transitory computer readable storage medium of claim 15, wherein the machine learning model is at least based on a pre-trained model.

17. The non-transitory computer readable storage medium of claim 16, wherein the pre-trained model comprises training data associated with operations other than the requested job type.

18. The non-transitory computer readable storage medium of claim 15, wherein the machine learning model is at least based upon a transferred learning model.

19. The non-transitory computer readable storage medium of claim 15, wherein the analytics learning environment further comprises a monitoring component, the monitoring component monitoring data and metrics associated with the job of the requested job type.

20. The non-transitory computer readable storage medium of claim 19, wherein upon completion of the job of the requested job type, the machine learning model is updated based upon the monitored data and metrics associated with the job of the requested type.

* * * * *